United States Patent
Kolze et al.

(10) Patent No.: US 9,049,069 B2
(45) Date of Patent: Jun. 2, 2015

(54) SPARSE EQUALIZER SYSTEM

(71) Applicant: BROADCOM CORPORATION, Irvine, CA (US)

(72) Inventors: Thomas J. Kolze, Phoenix, AZ (US); Richard Stephen Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 70 days.

(21) Appl. No.: 13/848,169

(22) Filed: Mar. 21, 2013

(65) Prior Publication Data

US 2013/0251019 A1    Sep. 26, 2013

Related U.S. Application Data

(60) Provisional application No. 61/613,958, filed on Mar. 21, 2012.

(51) Int. Cl.
*H03H 7/30*      (2006.01)
*H04L 25/03*     (2006.01)

(52) U.S. Cl.
CPC .... *H04L 25/03885* (2013.01); *H04L 25/03987* (2013.01); *H04L 25/03343* (2013.01); *H04L 2025/03426* (2013.01); *H04L 2025/03471* (2013.01); *H04L 2025/03566* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS 5,517,213 A * 5/1996 Bhatt et al. ..................... 375/232
2004/0001427 A1 * 1/2004 Belotserkovsky et al. ... 370/208

* cited by examiner

*Primary Examiner* — Adolf DSouza
(74) *Attorney, Agent, or Firm* — Garlick & Markison; Shayne X. Short

(57) ABSTRACT

A sparse equalizer system is disclosed. One or more multiple tapped delay lines (e.g., equalizers and/or pre-equalizers) are implemented to service one or more respective channels with which a communication device operates to support communications with at least one other communication device. Adaptive selection of which subsets of taps of the one or more multiple tapped delay lines is made to control those particular taps of which contribute to one or more subsequent slicer inputs. Those taps which are not currently operating to contribute to the slicer input may undergo processing, updating, etc. in parallel with or simultaneously with the processing of a signal to generate the outputs to be provided to the one or more subsequent slicers.

20 Claims, 11 Drawing Sheets

US 9,049,069 B2

SPARSE EQUALIZER SYSTEM

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Patent Application Ser. No. 61/613,958, entitled "Sparse equalizer system," filed Mar. 21, 2012.

Incorporation by Reference

The following U.S. Utility patent application is hereby incorporated herein by reference in its entirety and made part of the present U.S. Utility patent application for all purposes:

1. U.S. Utility patent application Ser. No. 13/780,026, entitled "Flexible adaptive equalizer," which claims priority pursuant to 35 U.S.C. §119(e) to the following U.S. Provisional patent application which is hereby incorporated herein by reference in its entirety and made part of the present U.S. Utility patent application for all purposes:

1.1. U.S. Provisional Patent Application Ser. No. 61/604,452, entitled "Flexible adaptive equalizer," filed Feb. 28, 2012.

BACKGROUND OF THE INVENTION

1. Technical Field of the Invention

The invention relates generally to communication systems; and, more particularly, it relates to equalization and/or pre-equalization processing and operative devices operative within such communication systems.

2. Description of Related Art

Data communication systems have been under continual development for many years. Generally speaking, communication device is limited within such systems may include a number of different modules, circuits, functional blocks, etc. therein. As the amount of circuitry and associated capability of a given device increases, generally, the overall size and associated costs that such a device similarly increases. In addition, as various communication systems seek to provide services across more and more channels, more and more streams, etc., the degree of complexity of such devices implemented within and operative within such systems similarly increases. As the number of operations to be performed per second, or the number of channels to be serviced by a given device, continues to increase, the overall size, area, cost, and complexity of such devices continues to increase.

The current state-of-the-art does not provide an adequate means by which such devices may be designed and implemented to service such ever expanding and growing communication systems, including those operating to service multiple respective channels, multiple respective streams, etc. For example, as the number of respective channels to be serviced by a given device continues to increase, as well as the information rate (e.g., symbol rate continues to increase), the current state-of-the-art does not provide an acceptable solution to meet the ever increasing desire to transmit a greater amount of information between respective devices within a system.

DETAILED DESCRIPTION OF THE INVENTION

Figure 1:
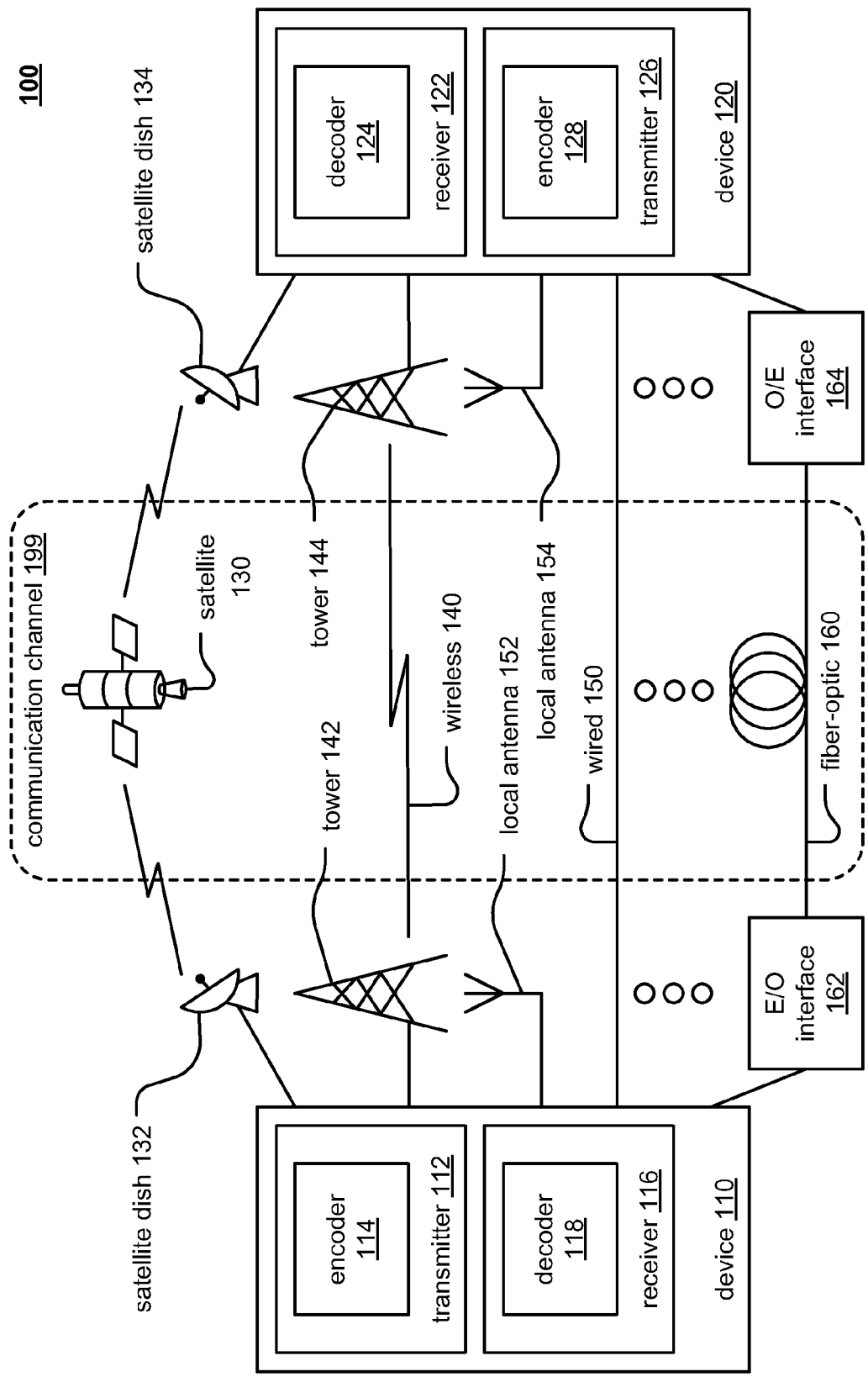
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
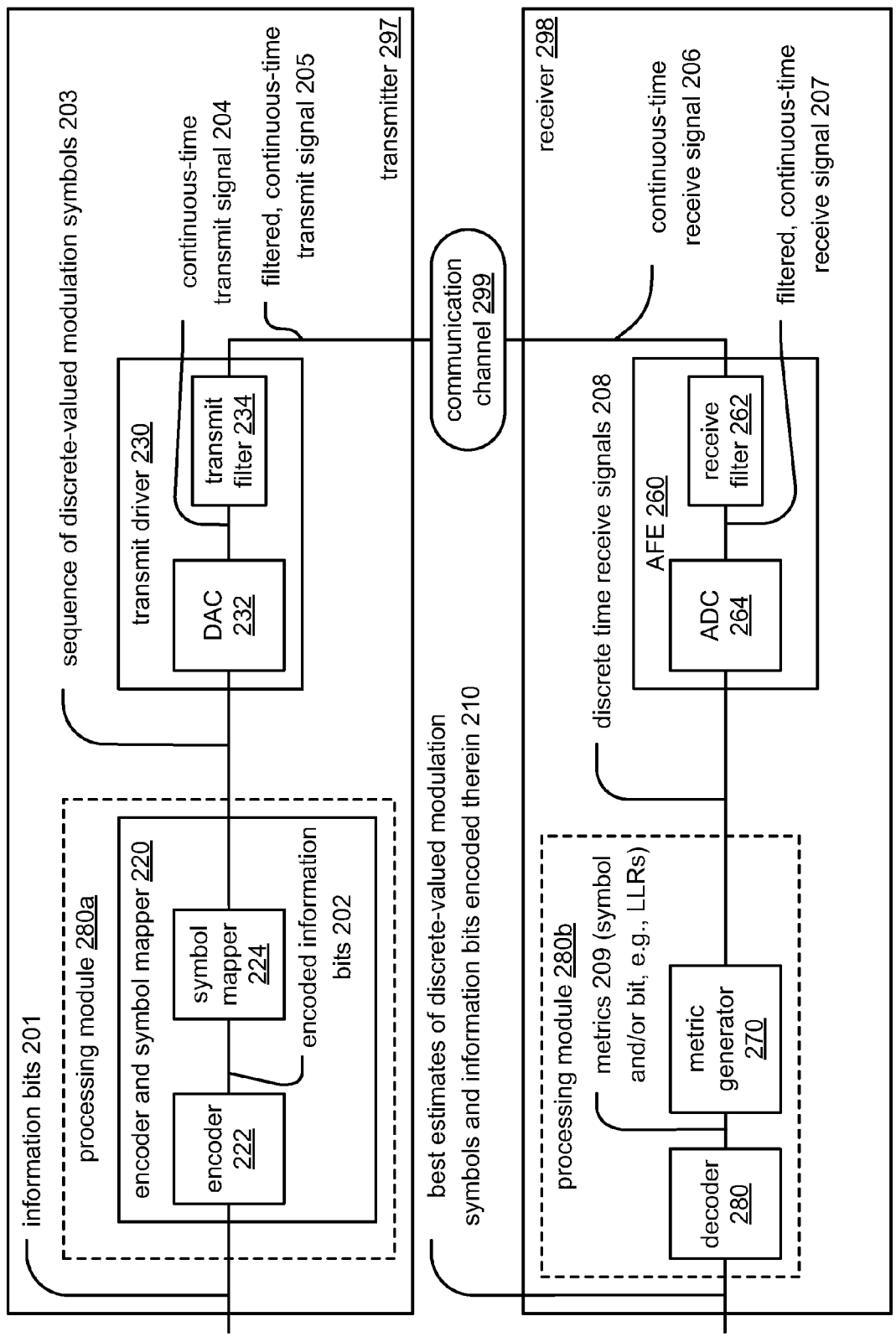

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
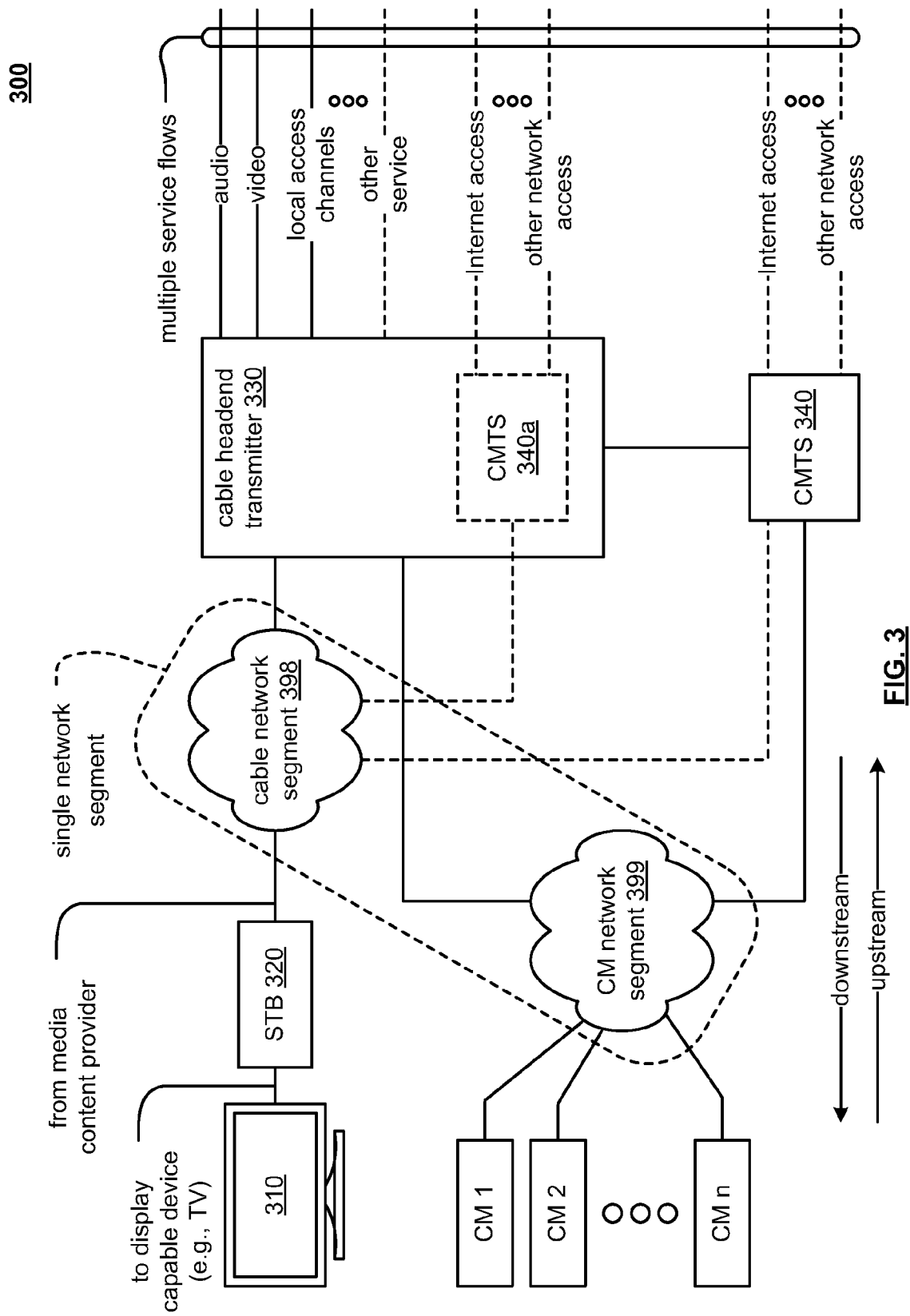

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340a may also be coupled to the cable network segment 398, as the STB 320 may itself include cable modem functionality therein.

It is also noted that any one of the cable modems 1, 2, ... m n, the cable headend transmitter 330, the CMTS 340 or 340a, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Figure 4:
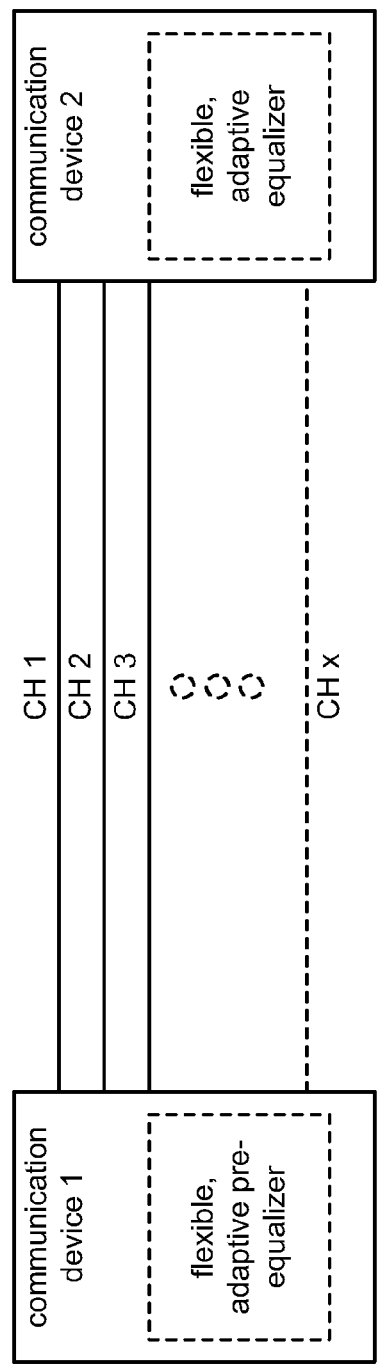
FIG. 4 illustrates an embodiment of different respective communication devices connected and/or coupled via one or more communication channels.

FIG. 4 illustrates an embodiment 400 of different respective communication devices connected and/or coupled via one or more communication channels. As may be seen with respect to this diagram, different respective communication devices may be connected and/or coupled via one or more communication channels which may correspond to one or more communication systems, networks, network segments, etc.

In certain embodiments, a flexible, adaptive pre-equalizer is implemented within a communication device to effectuate pre-equalization processing of one or more signals to be transmitted via one or more communication channels. In other embodiments, a flexible, adaptive equalizer is implemented within a communication device to effectuate equalization processing one or more signals received from one or more communication channels. Of course, it is noted that a given communication device having transceiver capability could include both a flexible, adaptive pre-equalizer (e.g., for transmitter associated operations) and a flexible, adaptive, adaptive equalizer (e.g., for receiver associated operations) without departing from the scope and spirit of the invention.

Figure 5:
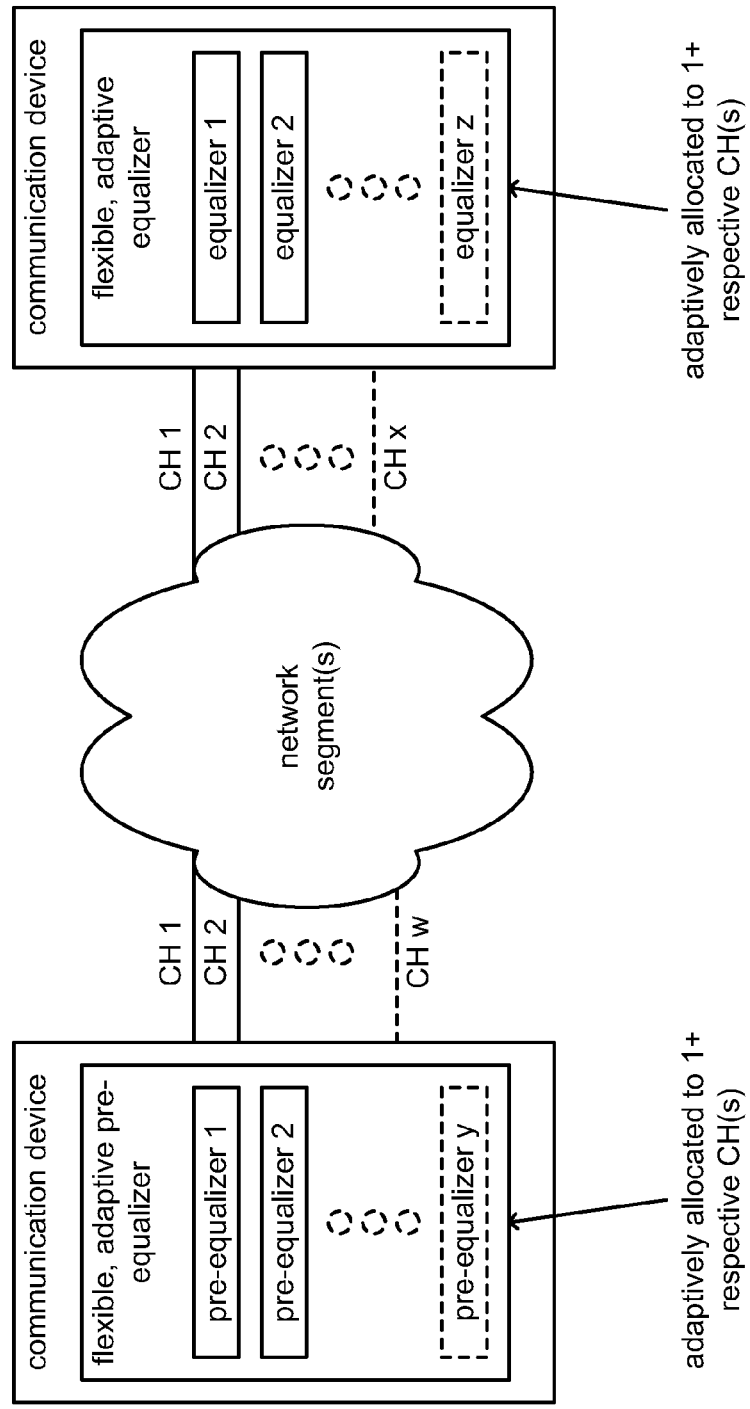
FIG. 5 illustrates an alternative embodiment of different respective communication devices connected and/or coupled via one or more communication channels.

FIG. 5 illustrates an alternative embodiment 500 of different respective communication devices connected and/or coupled via one or more communication channels. As may be seen with respect to this diagram, different respective communication devices may be connected and/or coupled via one or more communication channels which may correspond to one or more communication systems, networks, network segments, etc.

Referring to this particular diagram, it can be seen that a flexible, adaptive pre-equalizer (which may be implemented within any desired communication device) may be implemented that includes a number of different respective pre-equalizer modules, circuitries, functional blocks, or other respective components. Analogously, it can be seen that a flexible, adaptive equalizer (which may be implemented within any desired communication device) may be implemented that includes a number of different respective equalizer modules, circuitries, functional blocks, elements, or other respective components. Generally speaking, such pre-equalizer or equalizer modules, circuitries, functional blocks, elements, or other respective components may be referred to as pre-equalizer elements or equalizer elements.

Such an architecture which may be implemented with respect to either a flexible, adaptive pre-equalizer or equalizer will include a number of respective modules, circuitries, functional blocks, elements, or other respective components each respectively including adaptive equalizer or per equalizer taps, machinery, etc. Any desired number of pre-equalizer elements and/or equalizer elements may be implemented within any given device. As stated with respect other diagrams and/or embodiments herein, it is of course noted that both a flexible, adaptive pre-equalizer and a flexible, adaptive equalizer may be implemented within a singular device (e.g., a device may include both an embodiment of a pre-equalizer and an equalizer in accordance with the subject matter as claimed by the Applicant).

Figure 6:
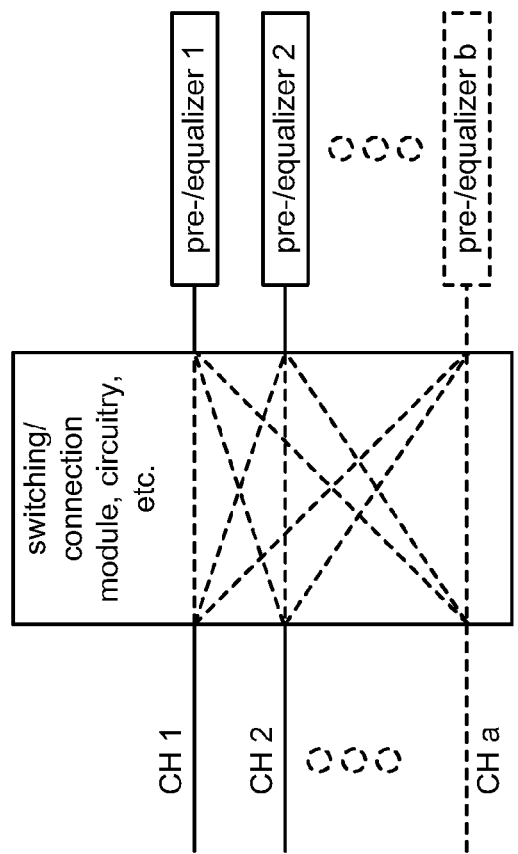
FIG. 6 illustrates an embodiment of selective switching/connectivity between one or more communication channels and one or more communication pre-equalizer and equalizers.

FIG. 6 illustrates an embodiment 600 of selective switching/connectivity between one or more communication channels and one or more communication pre-equalizer and equalizers. As may be seen with respect to this diagram, any desired connectivity between a number of pre-equalizers or equalizers may be made with respect to performing processing of signals corresponding to one or more respective communication channels. For example, all of the pre-equalizers or equalizers may be employed to perform processing of a signal corresponding to any one of the respective communication channels. In addition, as few as one or any desired subset of the pre-equalizers or equalizers may alternatively be employed to perform processing of a signal corresponding to any one of the respective communication channels.

Generally speaking, such an adaptable architecture allowing for switching/connection of any respective pre-equalizer or equalizer elements, including all of the respective pre-equalizer or equalizer elements and including any desired subset of the pre-equalizer or equalizer elements, will allow for stringing together and concatenation of a number of respective desired types of pre-equalization or equalization. For example, such flexibility of switching/connection of any desired group of one or more pre-equalizer or equalizer elements will allow for adaptation with respect to processing of signals corresponding to one or more communication channels. For example, different respective amounts and degrees of pre-equalization or equalization may be selectively applied to one or more signals corresponding to one or more communication channels. Adaptive application of these respective pre-equalizer equalizer elements will allow for the treatment of different respective signals, respective portions of the spectrum of one or more signals, etc. being handled differently.

Also, herein, in accordance with any one or more of the various aspects, embodiments, and/or their equivalents, of the invention, a sparse time-domain equalizer includes a tap-delay line equalizer of M taps. In certain embodiments, the number of equalizer taps includes N taps, with N<M taps contributing to the equalizer output; these are the "effective taps" of the sparse equalizer. The remaining M–N taps are not contributing to the equalizer output. Herein, the management of the equalizer tap coefficient updates and the selection of effective taps, without interrupting the equalizer operation in service, is performed in conjunction with the equalizer under continual operation.

Such embodiments are particularly suited to HFC plants, but any system, communication system, etc. which benefits from equalization, and especially which also may benefit from higher modulation bandwidth, will benefit from various aspects, embodiments, and/or their equivalents, of the invention.

In HFC plants, as higher modulation bandwidths are desired, and introduce benefits and simplicity and desired characteristics in a number of ways, one drawback is increased complexity in terms of number of taps per channel and number of multiplies per second for coverage of a bandwidth span. However, as the modulation rate increases, the nature of the impulse response in HFC plants begins to reveal itself in tap coefficient values of corresponding channel equalizers; as the channel modulation rate increases, the "resolution" or ability to resolve individual "spikes" in the channel impulse response is sharpened, as opposed to the lumping or smearing out which may occur at a lower modulation rate. In HFC plants, as modulation bandwidth is increased, while the time span of an equalizer remains the same, and thus requires more taps to cover at the higher symbol rate, many very low valued tap coefficients develop, because their tap delay location does not correspond to reflection delays within the plant. Thus, as the modulation rate increases in HFC plants, equalizers in general require more complexity, but beneficially many of the taps of the equalizer at the higher modulation rates are not necessary contributors. There is a benefit for recognizing that many taps in the equalizer do not need to contribute to the output, and there is a need to determine which taps should remain contributing (the effective taps), and to continually update this determination; the providing of these functions and operations is the Sparse Equalization System.

Characteristics and Features for Managing Sparse Equalizer

In one embodiment, the error signal is fed back and multiplied by the input signal in the tap delay line at more than N tap positions to update the tap coefficients even of the "ineffective" taps.

Updating of "ineffective" tap coefficients may be on a subsampled basis, and may be rotated among the various ineffective taps, reducing the multiply and other operations required in an M tap equalizer. The tap update calculations may be simplified, such as using fewer bits of precision, compared to the coefficient updates for the effective taps, to further reduce complexity.

In one embodiment, signal values at a given tap and corresponding fed back error signal values are stored and batch processed to update an ineffective tap coefficient; this processing need not be real-time, and may be off-loaded to a suitable processor.

Comparison of ineffective tap coefficients with effective tap coefficients may result in re-categorization of an ineffective tap.

In one embodiment, a number K of ineffective tap coefficients M-N are kept updated at the same or near same rate and fidelity of the effective tap coefficients, these being the largest of the ineffective taps (in general) and thus more carefully monitored for replacement of an effective tap, rapidly and with dependable tap coefficient value.

Consider N effective sparse taps. Then consider an $N+1^{st}$ other tap coefficient multiplier and its associated tap coefficient update machinery (another multiply, and the fed back error and the signal value at that particular tap position, another multiply by a gain, mu for example, and an accumulator; multiply by gain term may be by power of 2 to simplify, for example, i.e., just shifting bits). In other words, this is the $N+1^{st}$ tap. But it is not contributing to the equalizer output. It is an ineffective tap, but its tap coefficient is being kept up-to-date.

Then, the $N+1^{st}$ tap may be moved around, and the effect of that may be tracked and monitored (e.g., see how it responds and grows).

Expanding, in one embodiment, there are even more calculations of fed back error and signal values at various taps. Then, the device can allow one additional, or a number, plurality or multiplicity of additional of these taps accumulate, so the tap coefficients are calculated that are not being using in the equalization—calculating more tap values than there are actual taps (contributing to the equalizer output). If such a device includes only N full taps (but still allowed to be sparse), and for example either one roving tap with only update and accumulate machinery (or maybe a full group K of other taps may be permitted, for example, in an alternative embodiment), then this is more complexity than N taps, but each "update and accumulate" tap coefficient calculator is only about half the complexity of a full tap (actually, a little more than half).

The orthogonality principle holds in this situation and will drive the "rover" tap coefficient to a meaningful value even when it is not participating in the actual error signal computation. As such, tap coefficient values for taps that are not participating in the slicer input may be calculated. However, the complexity for say 4 of these tap coefficient calculations is more than the complexity for 2 full taps.

But the ineffective tap coefficients may not warrant frequent update or revisiting, especially in the HFC environment, where the channel impulse response may often be static. This approach to managing a sparse equalizer is a very good fit for application to the HFC plant.

In HFC application, there are many channels, and an approach where each channel has N effective taps, and there is a "coefficient analyzer" processor which can rotate among the various channels, determining when applied to a given channel if any of the effective taps should be substituted out. A "coefficient monitor" could cycle or continually monitor the effective coefficient tap values of one or a multiplicity of channels for "dynamics," indicating that the coefficients need to be revisited at that channel.

In the HFC plant the topology of the plant and the source of reflections ("echoes") are a significant source of channel impulse response, and these sources' distances from each other and transmitter and receiver are common, of course, among all channels. A coefficient monitor (e.g., an updater of gains, coefficients, etc. within one of more multiple tap delay lines (equalizers)), in one embodiment, will note correlation among different channels of which taps are the N effective taps, and which are the K ineffective taps which are candidates for substitution. If one channel in a set of channels which has correlation of some of the N taps with lowest tap coefficient power, and correlation of the K leading candidate ineffective taps, then upon discovering a change or potential substitution circumstance in one such channel of a group, the coefficient monitor (e.g., updater) will trigger examination of the similar tap in the other channels in the correlated set of channels.

The coefficient monitor (e.g., updater) will track the lowest or several lowest power coefficient values (in each channel or circulating), and if the lowest is trending down, this would trigger a coefficient analyzer (which may be implemented within a common circuitry, devices, module, etc., as the coefficient monitor (e.g., updater) or separately there from) to update the tap coefficient for one or several candidate ineffective taps as replacement(s). An auto-detect indicator may be applied to low or lowest effective tap coefficients to trigger further investigation of replacement taps.

In an embodiment, there is an initialization mode where many more than N tap coefficients are calculated, to determine the N largest power taps. This is a special processor for which really only one is needed, barring any rapid initialization requirements.

There are means to identify which are the best N taps in a sparse equalizer in addition to "moving around" one or a few full taps, or moving full-capable "rover" taps around to each channel for a time. One or more "rover" tap coefficient calculators can be used, for example, which are less complex than the equivalent number of full taps; and a large set of such "rover" tap coefficient calculators can be designed, to support identifying the "best" N taps, one channel at a time. In any case, finding the "best" N taps in a sparse equalizer is aided in such an application by the fact that the corresponding channels are relatively non-dynamic (e.g., especially compared to wireless, mobile wireless, to name two examples, and/or other wireless and relatively more dynamic channels).

Note that a step in an iterative approach may be to slide contiguous equalizer taps around, effectively changing the center tap position. This can be done to find the best position for the center tap (optimizing slicer signal to noise ratio (SNR)) but will also provide an idea of what several pre and post equalizer tap coefficients might be just beyond the optimal span location (optimal for maximizing slicer SNR).

This step iteration may be something that an equalizer would do even if it did not have sparse capability. It is sort of probing its environment.

If there are additional taps available to be applied to some channels, then this probe information would be helpful for determining where additional taps will provide the best value (of course, placing the additional taps in each channel and measuring the resulting slicer SNR is a more direct step, but if the "sliding" is done, for optimal placement of the original span, then the results of the sliding can be "remembered" and subsequently used to reduce alternatives, at least).

It is noted that adaptive equalizers with sparse capability are adaptable for a number of applications. With respect to certain embodiments (e.g., DOCSIS 4.0 and/or other applications), a corresponding sparse pre-equalizer capability may also be implemented in the transmitters.

Generally speaking, transmitter pre-equalization in upstream transmitters may be implemented to be sparse equalizers.

The coefficients for the transmit pre-equalization would be computed, and/or transmitted and computed, by the various means as in DOCSIS today, except that the equalizer end result would be sparse. The transmitted coefficient information to the CM may be sparse as well, or perhaps many coefficients are sent to CM and it thins the coefficient set to arrive at the effective taps.

For a couple of points—the equalizer coefficients result from solving a Least Mean Square solution, and this can be done via analysis using matrix arithmetic, given the impulse responses, etc.; the famous "LMS approach" which iterates to the solution and is used in practice is a recursive approach to approaching the LMS solution, but closed form solution is possible. With the tool finding the closed form solution it is very easy to examine and compare the performance of a wide variety of sparse equalizers, of course with an impulse response in hand.

Below is an approach for operation of a receiver for a particular channel, with flexible sparse tap capability, starting with an N tap contiguous tap spacing equalizer, and expanding taps outward and dropping interior taps as further out taps are discovered which have more coefficient power than an interior tap:

Converge an adaptive equalizer with evenly spaced taps. Then, monitoring of the slicer SNR is performed.

Examine the tap coefficients; in particular identify low magnitude tap coefficients; especially note coefficients with magnitude which correspond to the slicer SNR, or lower.

Move a tap which has the lowest magnitude and place it at the "end" of the existing taps, either pre or post or predetermined; one approach is select pre or post based on tap power summed in the two or three taps at either end, moving the new tap to the "heaviest" end.

If an additional tap is available, in addition to the "original" tap contiguous positions, then this additional tap may be used in the step above, rather than removing a low power tap from within the span.

Even if no tap power in the original span is lower than the slicer SNR, in one embodiment the tap with the lowest tap power is still used to evaluate equalizer results with taps placed outside the original span. It is possible that the slicer SNR is being degraded by a portion of the impulse response beyond the original equalizer span. Finding equalizer tap positions which provide the highest slicer SNR is the goal.

This tap can be moved farther and farther from the contiguous taps while monitoring and storing its resulting weight, and resulting slicer SNR, at each step. Tap positions at both pre and post may be evaluated.

It can be placed back at a location where it has the largest power, or which provides the highest SNR (in another embodiment), hopefully both.

Another tap (the lowest tap power) in the original span can be positioned using the results gathered by moving the first repositioned tap to various long delays.

These steps continue until the tap powers in the original span are no longer comparable to or appreciably lower than the slicer SNR, and/or the tap powers of some of the recently moved taps placed outside the original span are smaller than the remaining original span tap powers, and/or the slicer SNR is no longer lowered by subsequent repositionings (in another embodiment).

Perhaps there is a set of "roving" taps which can be applied to a given channel's adaptive equalizer, and each channel can be systematically "probed" with these additional roving taps using the approach above, except that the original tap positions do not have to be removed during the probing, until a set of more distant tap locations is determined which have higher tap powers (and provide correspondingly higher slicer SNR).

For example, a roving set of 8 taps could be placed 4 pre and 4 post alongside an equalizer with an original tap spacing.

The 8 lowest power taps are identified, and positioned at the next furthest positions (and if for example all four of the newly placed "pre" taps in the previous step were low power, then the next 8 tap positions would all be "post").

This process continues.

With a multiplicity of channels, if the implementation architecture permits, taps can be removed from one channel and added to another, using approach such as finding the best position for a tap among two channels, maximizing the min SNR of the two channels (assuming both are using the same constellation density—otherwise SNR margin would be "max min"ed). This approach generalizes to more than two channels.

In other words—in a multi-channel receiver, especially in HFC plants, that cable tilt and diplexer filter rolloff and other factors cause the equalizer stress to be different on two different channels (they may not all have similar frequency responses); an architecture allowing more equalizer taps on some channels than others is beneficial.

This may be provided by a flexible architecture which may allow tap modules to be connected to different channels; it may also be provided by simply having some equalizers with N1 taps and others with N2 taps (as an illustrative example) and connecting these equalizers to channels (such as tuning in the front end) appropriately that the more capable equalizers are operating with the channels which need that capability most.

It is noted that per the LMS performance of equalizers of various spans (with given impulse response) in the past, and that was when increasing an equalizer span for a T/2 spaced equalizer from N taps to N+1 taps, the values of the N original taps (in their optimal solution) did not change when the optimal solution was found for the N+1 case.

An analysis step for honing this approach for sparse equalizers is to determine if given a set of N sparse taps with optimal solution (for their spacing), when expanded by adding an additional tap somewhere in the system, will the values of the N taps stay the same, or may they change with the addition of a new tap. Perhaps if the new tap is "within the span" of the N sparse taps this property may be violated, but perhaps if the new tap is outside the span of the N sparse taps this property will hold. This is important for honing an iterative learning approach.

1. The complexity issue assumptions discussed are correct.
2. Increasing a channel bandwidth by a factor N requires N times the number of taps for covering the delay spread.
3. Increasing the number of channels by a factor N also requires N times the number of taps for utilizing the same bandwidth.
4. The multipliers in case 1 operate at the same speed as the single narrowband channel, but just N times as many in parallel.
5. The number of multipliers in case 2 is the same as case 1, but must operate at N times the speed of the single narrowband channel multipliers.

A possible solution to this problem depends on the reflection profile of the channel. Note that the coax distribution cable architecture has a highly regular reflection profile due to the regular spacing of amplifiers and taps (for most of the plant) due to the periodic spacing of utility poles or pedestals and the spacing between subscriber homes in a subdivision. Only in rare cases (like in some areas in the city of Boulder) do you find mansions interspersed around trailer parks.

With this in mind, then the N tap equalizer will have a few dominant coefficients to mitigate the mostly an approximately regular spacing of components with significant impedance mismatches. This would not be the case for distributed structural return losses in the coax cable itself, but such losses are generally designed to be much higher and not contribute reflections of significant amplitude compared to passives and amps.

So, the number of multipliers could be reduced to mitigate the significant reflections within the same equalizer span in a sparse matrix approach. If you allocate 1/N times the number of multipliers that can be selectively applied to the total number of taps (i.e. shift register delays or memory registers in a multiplier/accumulator filter) then the power will be the same. For example, 4 narrowband channels with 24 taps with a multiplier coefficient for every tap requires 96 multipliers at a clock rate fc. For a single wideband channel you need 96 taps to cover the same reflection delays. But if all the dominant reflections can be equalized with only 24 multipliers at a clock rate of 4*fc strategically distributed among the 96 taps, then the total power is reduced to the same value as in the multiple narrowband channel case.

The frequency response of a node+N coax segment plus one or two express feeders would probably fit such a reflection profile. Alternatively, the equalizer coefficient values can be extracted from the MIBS in the quadrature amplitude modulation (QAM) receivers in the field to corroborate the use of a sparse multiplier equalizer approach.

For a given "total bandwidth", a channel-bonded low-symbol rate QAM system will be more efficient than a higher symbol rate system from a physical layer (PHY) perspective (ignoring the channel bonding complexity in the MAC). If it is assumed that the same hardware architecture, the area will be the same between the two systems. However, the higher symbol rate system will require a higher clock rate, which results in a higher power (e.g., $P=C \times f \times v^2$), roughly 4× in dynamic power for the equalizer example. If the clock rate for both systems is fixed, this means that the low-rate system can share the hardware, thus potentially reducing the overall area.

Example of Case 1:

16 channels of 5.12 Msps (Mega-symbols/second) DOCSIS upstream channels for 16 channels×6.4 MHz/Channel=102.4 MHz of upstream bandwidth.

Then there is Case 2:

4 channels of 20.48 Msps DOCSIS upstream channels for 4 channels×25.6 MHz/Channel=102.4 MHz of upstream bandwidth.

If Case 1 requires 24 equalizer taps per channel, it is reasonable to expect Case 2 to require 96 equalizer taps (e.g., to basically cover the same delay spread in the impulse response) to achieve about the same equalizer SNR.

So, on a per channel basis, the equalizer grows linearly with symbol rate in terms of the number of taps required per channel.

However, to occupy the same bandwidth, which is essentially what is effectuated with respect to these embodiments, the number of equalizer taps is unchanged from Case 1 to Case 2.

Area sizings for the equalizers are totally in line with the number of taps in the equalizers. Thus, for a 4× symbol rate the area for the equalizer for one channel is 4×; but for however many channels it takes to occupy a given bandwidth, the area for equalizers is the same.

If "area" is the measure of "complexity," then the equalizer complexity is unchanged (e.g., or changed relatively minimally) if the symbol rate is moved to 4×.

With respect to various aspects, embodiments, and/or their equivalents, of the invention, it is noted that such comparisons are (essentially) on a basis of spectrum covered. For example, if one scheme is much more spectrally efficient than another, then the more efficient scheme could be sized with less occupied bandwidth of course, but for comparing Case 1 and Case 2 above the spectral efficiency is first-order the same.

Also, with respect to such "complexity" being compared, such comparison is made, at least from one perspective, with respect to area (e.g., real estate, footprint, etc.), or is it multiplies per second, where the latter may not be that critical for such architectures. In some alternative embodiments, "multiplies per second" may be an important design consideration.

Also, it is noted that such an architecture will benefit tremendously for elements or modules which each consist of adaptive equalizer taps and machinery, and these may be strung together in a number of flexible ways. Such chips and/or devices can have a given number of equalizer taps, and use them for Case 1, or connect them differently (fewer groups of longer strings of modules) for Case 2. Furthermore, these taps may also be beneficially used in such a way as to assign more of them to lower and upper band edge regions (impacted by roll-off filtering), leaving the middle portion of the spectrum requiring, and thus using, fewer taps per channel than the band edge channels.

Figure 7:
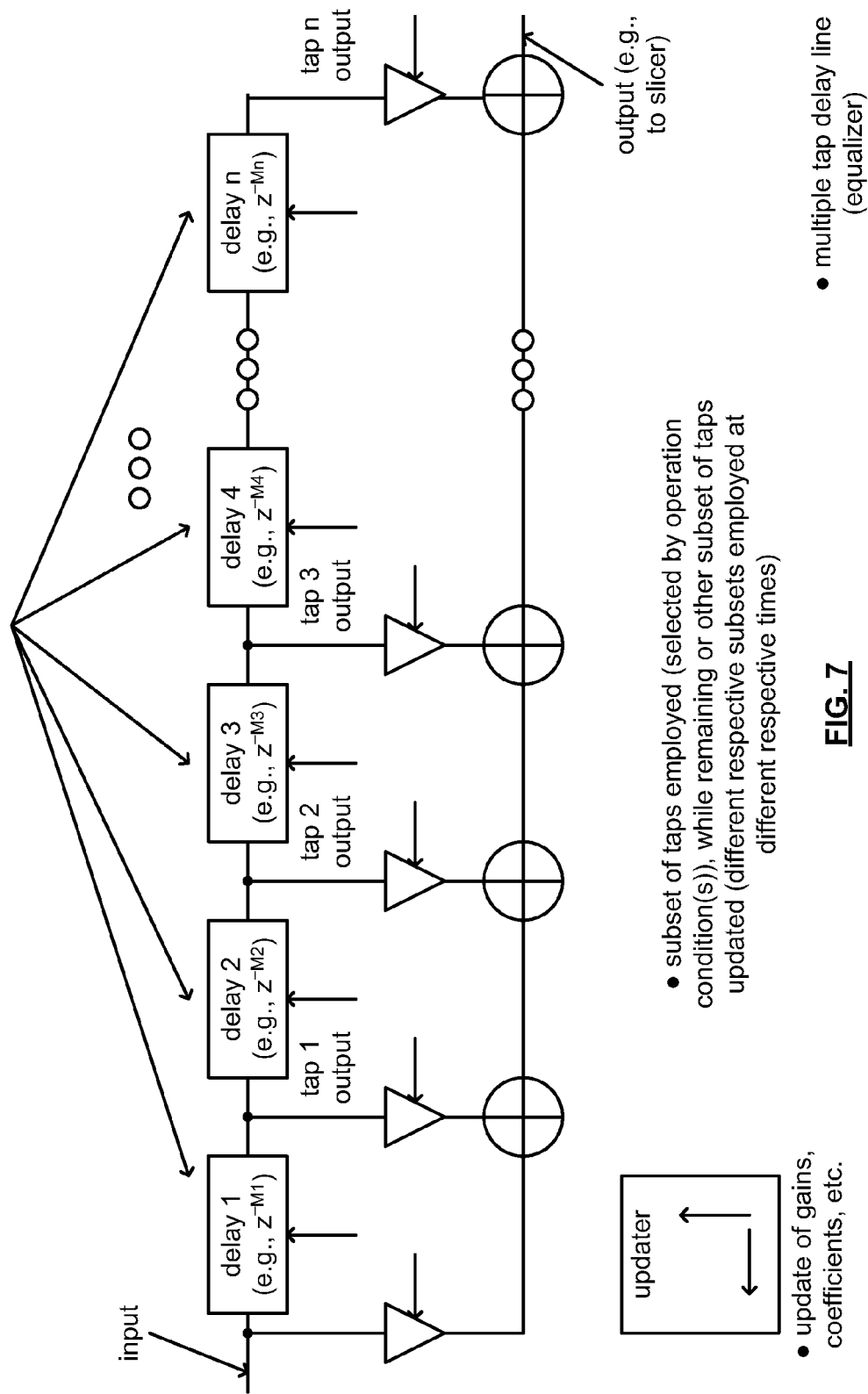
FIG. 7 illustrates an embodiment of a multiple tap delay line (equalizer).

FIG. 7 illustrates an embodiment 700 of a multiple tap delay line (equalizer). Generally speaking, various aspects, embodiments, and/or their equivalents, of the invention may be found in operating a device that includes a multiple tap delay line (equalizer) using some subset of the total available taps. For example, considering a first number of available taps, then less than all of those taps would be contributing to the equalizer output. A subset of the available taps may be employed to generate equalizer output, while those taps which are not being used may undergo computational operations, such as calculating, updating, or modifying the coefficient values. This partitioning of some taps being used within such a multiple tap delay line and some not being used may be viewed as being a partition between effective taps and inoperative or ineffective taps. That is to say, certain of the tap coefficient values may have relatively little contribution to the overall equalizer operation. However, it is noted that the respective values of such tap coefficients may be monitored or tracked to see if they grow in amplitude and may in fact be contributing more over time. If this happens, then such of those corresponding equalizer taps may in fact be brought into the overall processing employed to contribute to the equalizer output which would then be provided to a slicer in order to generate hard decision based on the signal.

It is noted that appropriate connectivity may be provided to bypass or not utilize any one or more of the respective taps of the equalizer or multiple tap delay line at any given time. That is to say, any one or more of the respective taps may be selectively used or not used to contribute to the overall equalizer output which would then be provided to a slicer in order to generate hard decision based on the signal.

This particular diagram shows an individual or singular multiple tap delay line as may be included within a device to perform equalization. In addition, it is noted that an appropriate updater device, module, circuitry, etc. may also be employed to effectuate the updating of gains, coefficients, etc. of any of the respective components within the multiple tap delay line. Also, with respect to the use of one or more roving taps, it is noted that such a roving tap may be implemented within a first one or more locations at a first time, but then a second one or more locations at a second time, and so on.

Considering this diagram, various aspects, embodiments, and/or their equivalents, of the invention may be found in a device that includes at least one communication interface to support communication with at least one additional apparatus via a plurality of channels. Such a device may also include an equalizer including a tapped delay line including a plurality of taps to operate in accordance with a plurality of coefficients, respectively. The device also operates to (e.g., using a processor therein) to select a first subset of the plurality of taps operative for equalization of at least one signal corresponding to at least one of the plurality of channels, such that a second subset of the plurality of taps inoperative for the equalization, to generate a processed signal, and also to update the second subset of the plurality of taps. A slicer of the device is implemented to process the processed signal to generate at least one hard decision.

Figure 8:
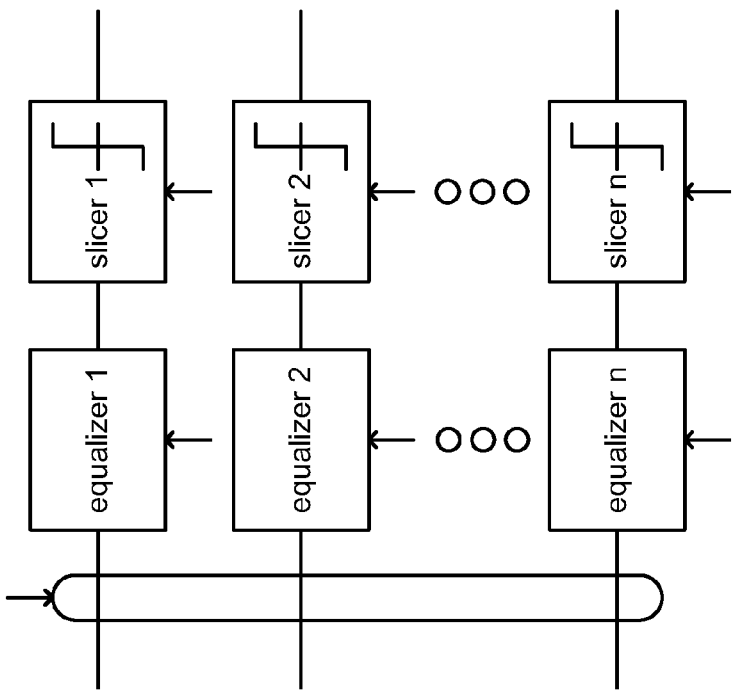
FIG. 8 illustrates an embodiment of multiple tap delay lines for multiple channels (multiple equalizers).
Figure 8:
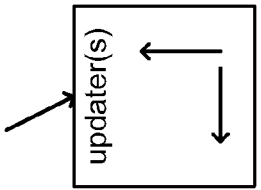

FIG. 8 illustrates an embodiment 800 of multiple tap delay lines for multiple channels (multiple equalizers). As may be seen with respect to this diagram, multiple respective multiple tap delay lines may be implemented for servicing multiple channels. From certain perspectives, a number of respected equalizers may be viewed as being implemented to service a number of different respective channels. It is noted that, with respect to reference to a channel, each of the respective channels may in fact be different physical communication channels. Alternatively, the channels may be viewed as being logical channels such as in accordance with some subdivision of one or more physical channels. In even another embodiment, the respective channels may correspond to different respective subcarriers in accordance with orthogonal frequency division multiplexing (OFDM) signaling (or different respective blocks or groups of OFDM subcarriers), or different respective spreading codes in accordance with code division multiple access (CDMA) modulation, etc. Any variety and/or combination of any type of orthogonal signaling scheme may be implemented to service multiple respective channels.

It is also noted that with respect to the various implementations which may be performed including different respective numbers of equalizer taps for different respective channels, and the ability to switch those around in a dynamic manner, within a multichannel system, such operations may analogously performed in accordance with transmit pre-equalization processing (e.g., such as with respect to downstream communications or from a transmitter communication device).

With respect to the operation of the tapped delay line, the respective coefficients within that delay line may be updated based on any of a number of conditions including at least one operating condition corresponding to at least one of a local operating condition corresponding to the apparatus, a remote operating condition corresponding to the at least one additional apparatus, and relative values of the plurality of coefficients, selecting the first subset of the plurality of taps operative for equalization.

The updating of such coefficients may be performed on a sub-sampled basis desired. For example, if a low amplitude coefficient is considered, there may be relatively little computational effort or energy to keep that tap coefficient up-to-date.

Also, it is noted that the adaptive operation of using different respective groups of taps, and their respective updated coefficient values, may operate to update or multiply the input to a subsequent one or more slicers. As may be understood, a number of multiplication operations will need to be performed when processing a given symbol based upon the number of taps employed within a given implementation of the tapped delay line. The greater the number of multiplies to be performed, there will be a corresponding increase of complexity, in that, the more taps that are required to multiply per second for those respective symbols will incur more computational operations. As may be understood, appropriate allocation of which of those particular taps and corresponding coefficient values are contributing most (e.g., those which are most operative, most effective, etc.) will beneficially allocate the available resources of given device. Accordingly, those particular resources which are not being used in a given time may undergo updating, modification, etc. simultaneously or in parallel with the processing used to generate the equalizer output to be provided to a subsequent one or more slicers. Generally speaking, consideration may be made, in accordance with any one or more of a number of operating conditions to ensure that those particular taps, namely, a subset of those taps, which are the most effective will be used at any given time.

For example, there may be a maximum number of taps that a given device may effectively afford to process while maintaining sufficiently low latency. However, that does not necessarily mean that all of that maximum number of taps need to be use any given time. For example, if there are fewer than that maximum number of taps that are contributing effectively and/or significantly, based upon their respective tab values, contributions, etc., then only that particular subset of taps need necessarily be used.

The reader will understand that various aspects, embodiments, and/or their equivalents, of the invention are directed towards two respective prongs of operation. For example, there may be understood to be a separation of the updating of the coefficients within one or more multiple tap delay lines and the adaptive and selective use of those coefficients for one or more respective channels. Effective selection and adaptation with respect to which of the particular taps are going to be used at any time will contribute to effective operation.

Also, it is noted that different respective numbers of taps may be allocated to service different respective channels at different perspective times. For example, a relatively lower frequency channel may require relatively fewer taps than a relatively higher frequency channel. In accordance with a system which may have dynamic characteristics with respect to one or more of the channels, appropriate adaptation with respect to the number of taps to be dedicated to any of the respective channels will also provide for improved performance. Certain embodiments operate in accordance with partitioning the total number of taps into at least two groups, namely, a first group which may be referred to as an effective tap group and a second group which may be referred to as an ineffective tap group. Appropriate and dynamic allocation of the various taps may be made among any one or more of the respective channels being serviced by a given device. Also, certain of the equalizer tap values may undergo processing, modification, or updating when they are not contributing to a symbol by symbol basis (e.g., such as when their one or more contributions are less than one or more particular thresholds).

Figure 9:
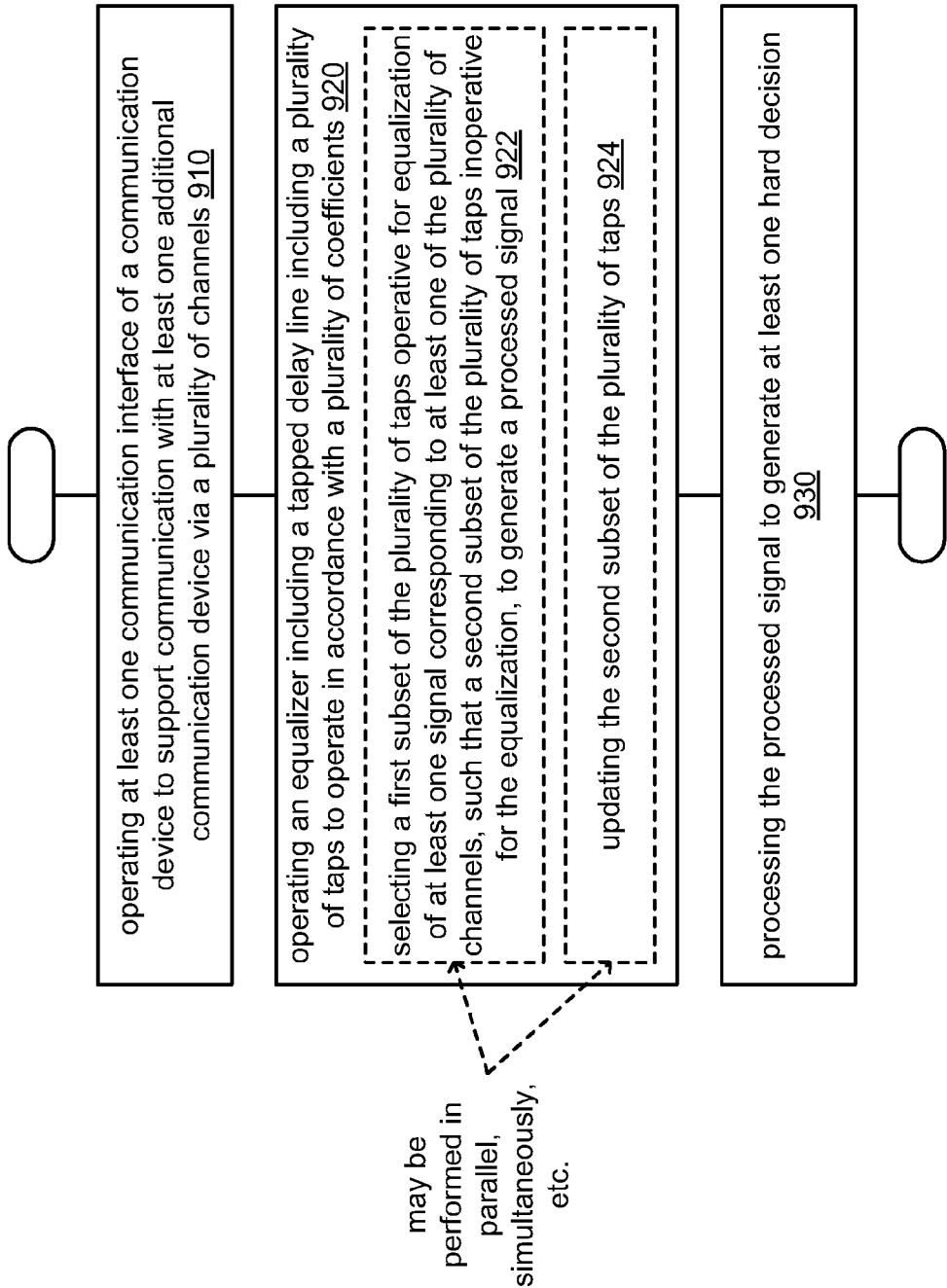
FIG. 9, FIG. 10, and FIG. 11 illustrate various embodiments of methods for operating one or more devices including communication devices.
Figure 10:
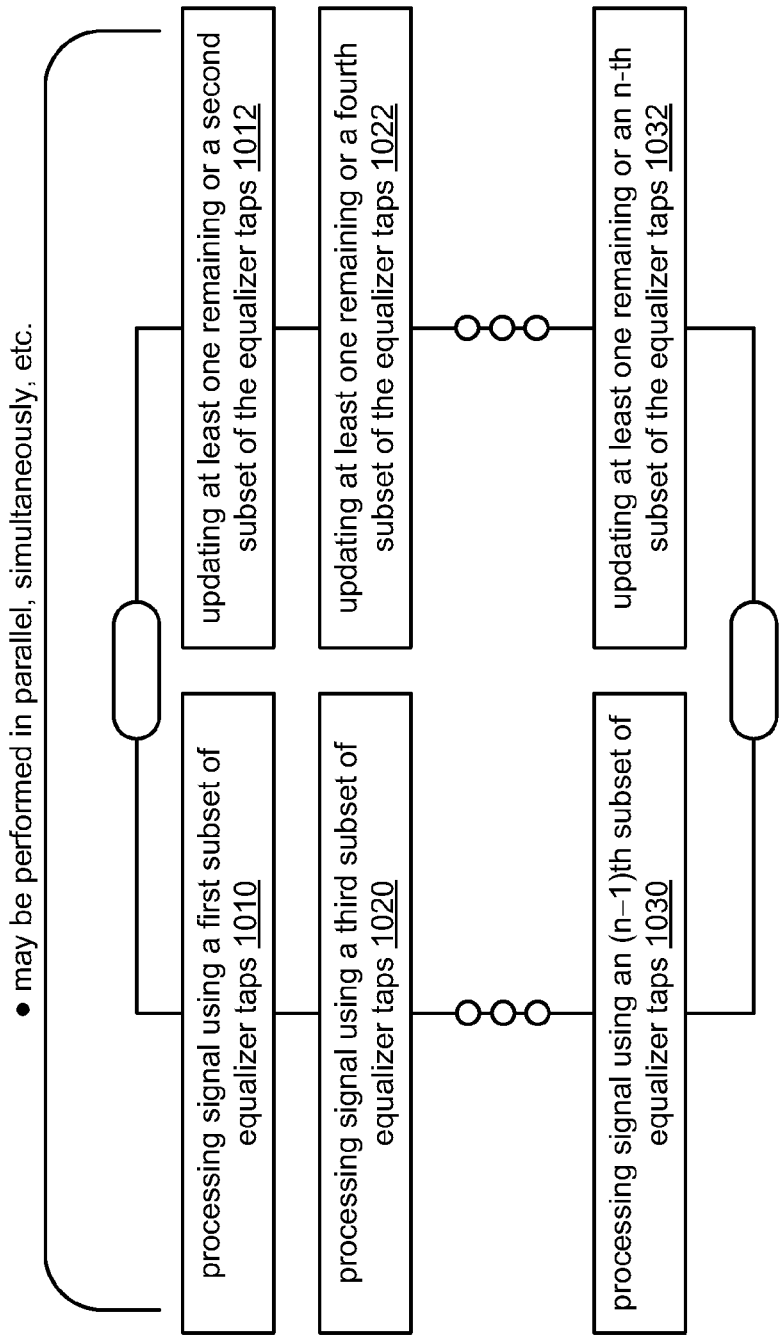
Figure 11:
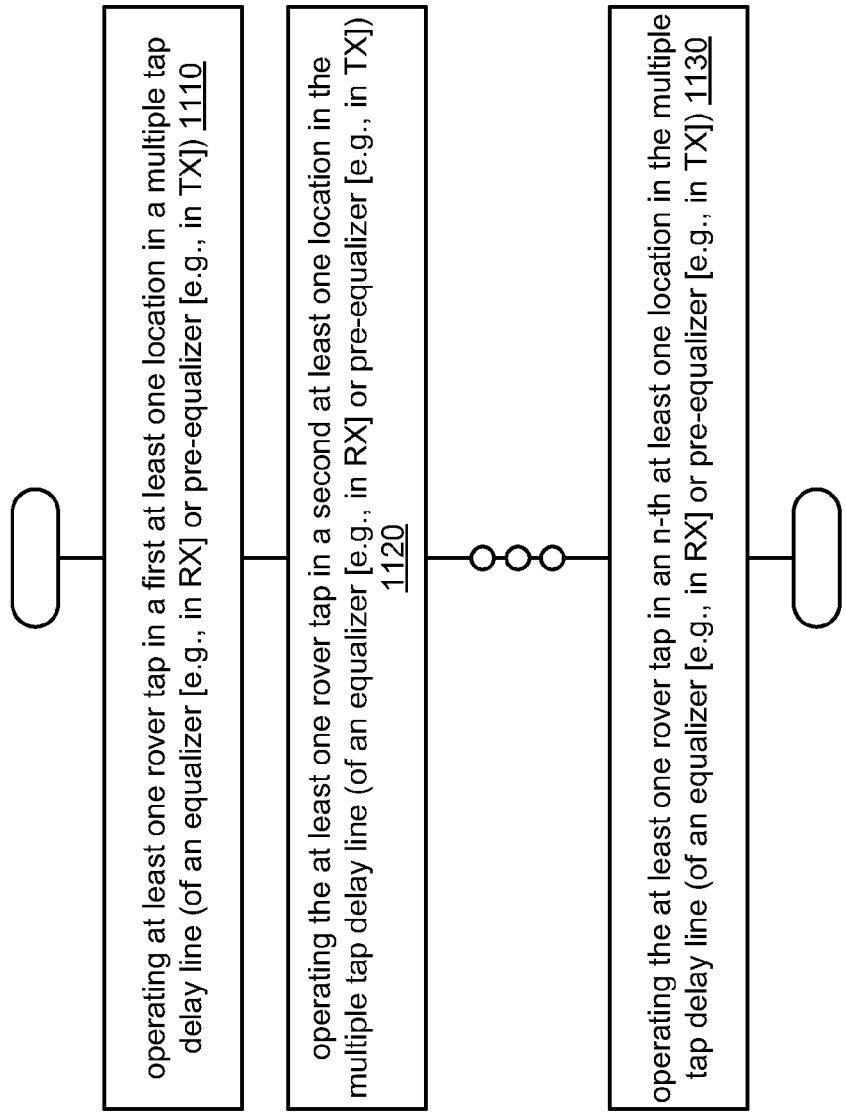

FIG. 9, FIG. 10, and FIG. 11 illustrate various embodiments of methods for operating one or more devices including communication devices.

Referring to method 900 of FIG. 9, the method 900 begins by operating at least one communication interface of a communication device to support communication with at least one additional communication device via a plurality of channels, as shown in a block 910. The method 900 continues by operating an equalizer including a tapped delay line including a plurality of taps to operate in accordance with a plurality of tap coefficients, as shown in a block 920.

It is noted that the method 900 may operate by selecting a first subset of the plurality of taps operative for equalization of at least one signal corresponding to at least one of the plurality of channels, such that a second subset of the plurality of taps inoperative for the equalization, to generate a processed signal, as shown in a block 922. Also, the method 900 may operate by updating the second subset of the plurality of taps, as shown in a block 924. Also, the operations of the blocks 922 and 924 may be performed in parallel, simultaneously, etc.

The method 900 then operates by processing the processed signal to generate at least one hard decision, as shown in a block 930.

Referring to method 1000 of FIG. 10, the method 1000 begins by processing signal using a first subset of equalizer taps, as shown in a block 1010. The method 1000 continues by processing signal using a third subset of equalizer taps, as shown in a block 1020. The method 1000 continues as such, respectively updating different respective subsets of equalizer taps. The method 1000 then operates by processing signal using an (n−1)th subset of equalizer taps, as shown in a block 1030.

Also, the method 1000 continues by updating at least one remaining equalizer taps (not included in the first subset) or a second subset of the equalizer taps, as shown in a block 1012. The method 1000 continues by updating at least one remaining equalizer taps (not included in the third subset) or a fourth subset of the equalizer taps, as shown in a block 1022. The method 1000 continues as such, respectively updating at least one remaining equalizer tap of (e.g., or unused, inactive, or ineffective) equalizer taps. The method 1000 continues by updating at least one remaining equalizer taps (not included in the (n−1)th subset) or an n-th subset of the equalizer taps, as shown in a block 1032.

Also, the operations of the blocks 1010, 1020, and 1030 may be performed in parallel, simultaneously, etc. with respect to the operations of the blocks 1012, 1022, and 1032. For example, in one embodiment, the operations of the block 1010 are performed in parallel, simultaneously, etc. with respect to the operations of the block 1012. Also, the operations of the block 1020 are performed in parallel, simultaneously, etc. with respect to the operations of the block 1022, and the operations of the block 1030 are performed in parallel, simultaneously, etc. with respect to the operations of the block 1032.

Referring to method 1100 of FIG. 11, the method 1100 begins by operating at least one rover tap in a first at least one location in a multiple tap delay line (of an equalizer [e.g., in RX] or pre-equalizer [e.g., in TX]), as shown in a block 1110. The method 1100 continues by operating the at least one rover tap in a second at least one location in the multiple tap delay line (of an equalizer [e.g., in RX] or pre-equalizer [e.g., in TX]), as shown in a block 1120. The method 1100 then operates by operating the at least one rover tap in an n-th at least one location in the multiple tap delay line (of an equalizer [e.g., in RX] or pre-equalizer [e.g., in TX]), as shown in a block 1130.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction with software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
at least one communication interface configured to support communication with at least one additional apparatus via a plurality of channels;
an equalizer that includes:
a first tapped delay line includes a first plurality of taps to perform equalization using a first plurality of coefficients, respectively; and
a second tapped delay line includes a second plurality of taps to perform equalization using a second plurality of coefficients, respectively;
a processor configured to:
select a first subset of the first plurality of taps operative for equalization of a first signal corresponding to a first of the plurality of channels, such that a second subset of the first plurality of taps is inoperative for the equalization, to generate a first processed signal;
update the second subset of the first plurality of taps when the first subset of the first plurality of taps is operative for the equalization of the first signal; and
select a first subset of the second plurality of taps operative for equalization of a second signal corresponding to a second of the plurality of channels, such that a second subset of the second plurality of taps is inoperative for the equalization, to generate a second processed signal;
update the second subset of the second plurality of taps when the first subset of the second plurality of taps is operative for the equalization of the second signal; and
a slicer configured to:
process the first processed signal to generate a first hard decision; and
process the second processed signal to generate a second hard decision.

2. The apparatus of claim 1, wherein the processor is further configured to:
select the first subset of the first plurality of taps operative for equalization of a first portion of the first signal corresponding to the first plurality of channels, such that the second subset of the first plurality of taps is inoperative for the equalization of the first portion of the first signal, to generate a first portion of the first processed signal; and
select a third subset of the first plurality of taps operative for equalization of a second portion of the first signal corresponding to the first plurality of channels, such that a fourth subset of the first plurality of taps is inoperative for the equalization of the second portion of the first signal, to generate a second portion of the first processed signal.

3. The apparatus of claim 1, wherein:
the plurality of channels correspond to a plurality of orthogonal signal elements of an orthogonal signaling scheme corresponding to at least one of orthogonal frequency division multiple access (OFDMA) signaling or code division multiple access (CDMA) signaling.

4. The apparatus of claim 1, wherein:
the plurality of channels correspond to a plurality of physical communication channels between the apparatus and the at least one additional apparatus.

5. The apparatus of claim 1 further comprising:
a communication device that is operative within at least one of a satellite communication system, a wireless communication system, a wired communication system, a fiber-optic communication system, or a mobile communication system.

6. An apparatus comprising:
at least one communication interface configured to support communication with at least one additional apparatus via a plurality of channels;
an equalizer that includes a tapped delay line that includes a plurality of taps configured to operate using a plurality of coefficients, respectively;
a processor configured to:
select a first subset of the plurality of taps operative for equalization of at least one signal corresponding to at least one of the plurality of channels, such that a second subset of the plurality of taps is inoperative for the equalization, to generate a processed signal; and
update the second subset of the plurality of taps when the first subset of the plurality of taps is operative for the equalization of the at least one signal; and
a slicer configured to process the processed signal to generate at least one hard decision.

7. The apparatus of claim 6, wherein the processor is further configured to:
calculate the plurality of coefficients for the plurality of taps; and
based on at least one operating condition corresponding to at least one of a local operating condition corresponding to the apparatus, a remote operating condition corresponding to the at least one additional apparatus, or relative values of the plurality of coefficients, select the first subset of the plurality of taps operative for equalization.

8. The apparatus of claim 6 further comprising:
the equalizer includes at least one additional tapped delay line that includes an additional plurality of taps to operate using an additional plurality of coefficients; and
the processor configured to:
select the first subset of the plurality of taps operative for equalization of a first signal corresponding to a first of the plurality of channels, such that the second subset of the plurality of taps is inoperative for the equalization of the first signal, to generate a first processed signal; and
select a first subset of the additional plurality of taps operative for equalization of a second signal corresponding to a second of the plurality of channels, such that a second subset of the additional plurality of taps is inoperative for the equalization of the second signal, to generate a second processed signal.

9. The apparatus of claim 6, wherein the processor is further configured to:
select the first subset of the plurality of taps operative for equalization of a first portion of the at least one signal corresponding to the at least one of the plurality of channels, such that the second subset of the plurality of taps is inoperative for the equalization of the first portion of the at least one signal, to generate a first portion of the processed signal; and
select a third subset of the plurality of taps operative for equalization of a second portion of the at least one signal corresponding to the at least one of the plurality of channels, such that a fourth subset of the plurality of taps is inoperative for the equalization of the second portion of the at least one signal, to generate a second portion of the processed signal.

10. The apparatus of claim 6, wherein the equalizer including:
a first tapped delay line that includes a first plurality of taps to operate using a first plurality of coefficients, respectively, to perform equalization of a first signal corresponding to a first of the plurality of channels; and
a second tapped delay line that includes a second plurality of taps to operate using a second plurality of coefficients, respectively, to perform equalization of a second signal corresponding to a second of the plurality of channels.

11. The apparatus of claim 6, wherein:
the plurality of channels correspond to a plurality of orthogonal signal elements of an orthogonal signaling scheme corresponding to at least one of orthogonal frequency division multiple access (OFDMA) signaling or code division multiple access (CDMA) signaling.

12. The apparatus of claim 6, wherein:
the plurality of channels correspond to a plurality of physical communication channels between the apparatus and the at least one additional apparatus.

13. The apparatus of claim 6 further comprising:
a communication device that is operative within at least one of a satellite communication system, a wireless communication system, a wired communication system, a fiber-optic communication system, or a mobile communication system.

14. A method for execution by a communication device, the method comprising:
operating at least one communication interface of the communication device to support communication with at least one additional communication device via a plurality of channels;
operating an equalizer that includes a tapped delay line that includes a plurality of taps to operate using a plurality of coefficients, respectively, including:
selecting a first subset of the plurality of taps operative for equalization of at least one signal corresponding to at least one of the plurality of channels, such that a second subset of the plurality of taps is inoperative for the equalization, to generate a processed signal; and
updating the second subset of the plurality of taps when the first subset of the plurality of taps is operative for the equalization of the at least one signal; and
processing the processed signal to generate at least one hard decision.

15. The method of claim 14, further comprising:
calculating the plurality of coefficients for the plurality of taps; and
based on at least one operating condition corresponding to at least one of a local operating condition corresponding to the apparatus, a remote operating condition corresponding to the at least one additional apparatus, or relative values of the plurality of coefficients, selecting the first subset of the plurality of taps operative for equalization.

16. The method of claim 14, wherein:
the equalizer includes at least one additional tapped delay line that includes an additional plurality of taps to operate using an additional plurality of coefficients; and further comprising:
selecting the first subset of the plurality of taps operative for equalization of a first signal corresponding to a first of the plurality of channels, such that the second subset of the plurality of taps is inoperative for the equalization of the first signal, to generate a first processed signal; and
selecting a first subset of the additional plurality of taps operative for equalization of a second signal corresponding to a second of the plurality of channels, such that a second subset of the additional plurality of taps is inoperative for the equalization of the second signal, to generate a second processed signal.

17. The method of claim 14, further comprising:
selecting the first subset of the plurality of taps operative for equalization of a first portion of the at least one signal corresponding to the at least one of the plurality of channels, such that the second subset of the plurality of taps is inoperative for the equalization of the first portion of the at least one signal, to generate a first portion of the processed signal; and
selecting a third subset of the plurality of taps operative for equalization of a second portion of the at least one signal corresponding to the at least one of the plurality of channels, such that a fourth subset of the plurality of taps is inoperative for the equalization of the second portion of the at least one signal, to generate a second portion of the processed signal.

18. The method of claim 14, wherein:
the plurality of channels correspond to a plurality of orthogonal signal elements of an orthogonal signaling scheme corresponding to at least one of orthogonal frequency division multiple access (OFDMA) signaling or code division multiple access (CDMA) signaling.

19. The method of claim 14, wherein:
the plurality of channels correspond to a plurality of physical communication channels between the communication device and the at least one additional communication device.

20. The method of claim 14, wherein the communication device is operative within at least one of a satellite communication system, a wireless communication system, a wired communication system, a fiber-optic communication system, or a mobile communication system.

* * * * *